March 22, 1932.  C. E. MAYNARD  1,850,238
APPARATUS FOR SPRAYING ANNULAR ARTICLES
Filed May 31, 1929  4 Sheets-Sheet 4
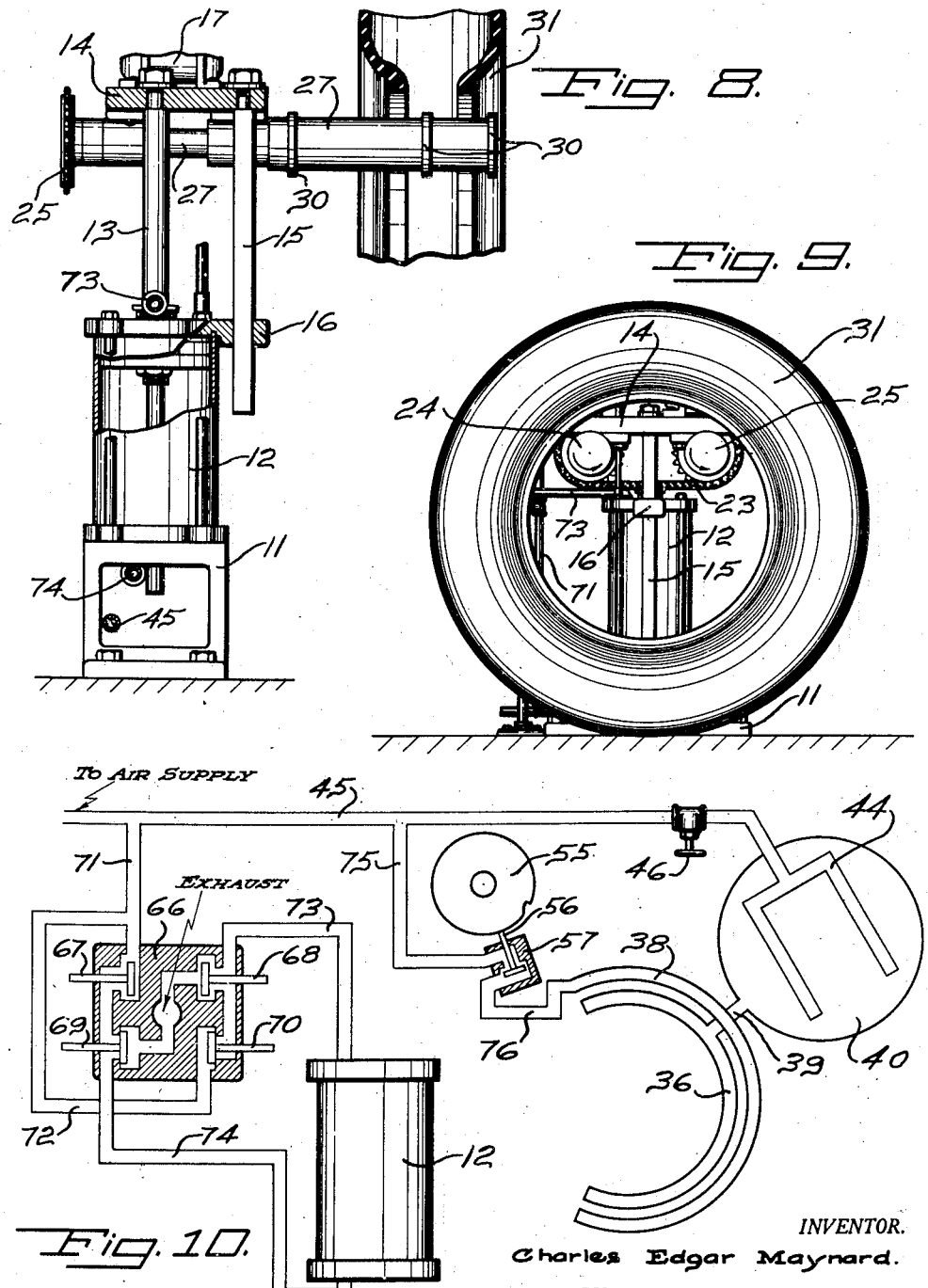
INVENTOR.
Charles Edgar Maynard.
BY
ATTORNEY.

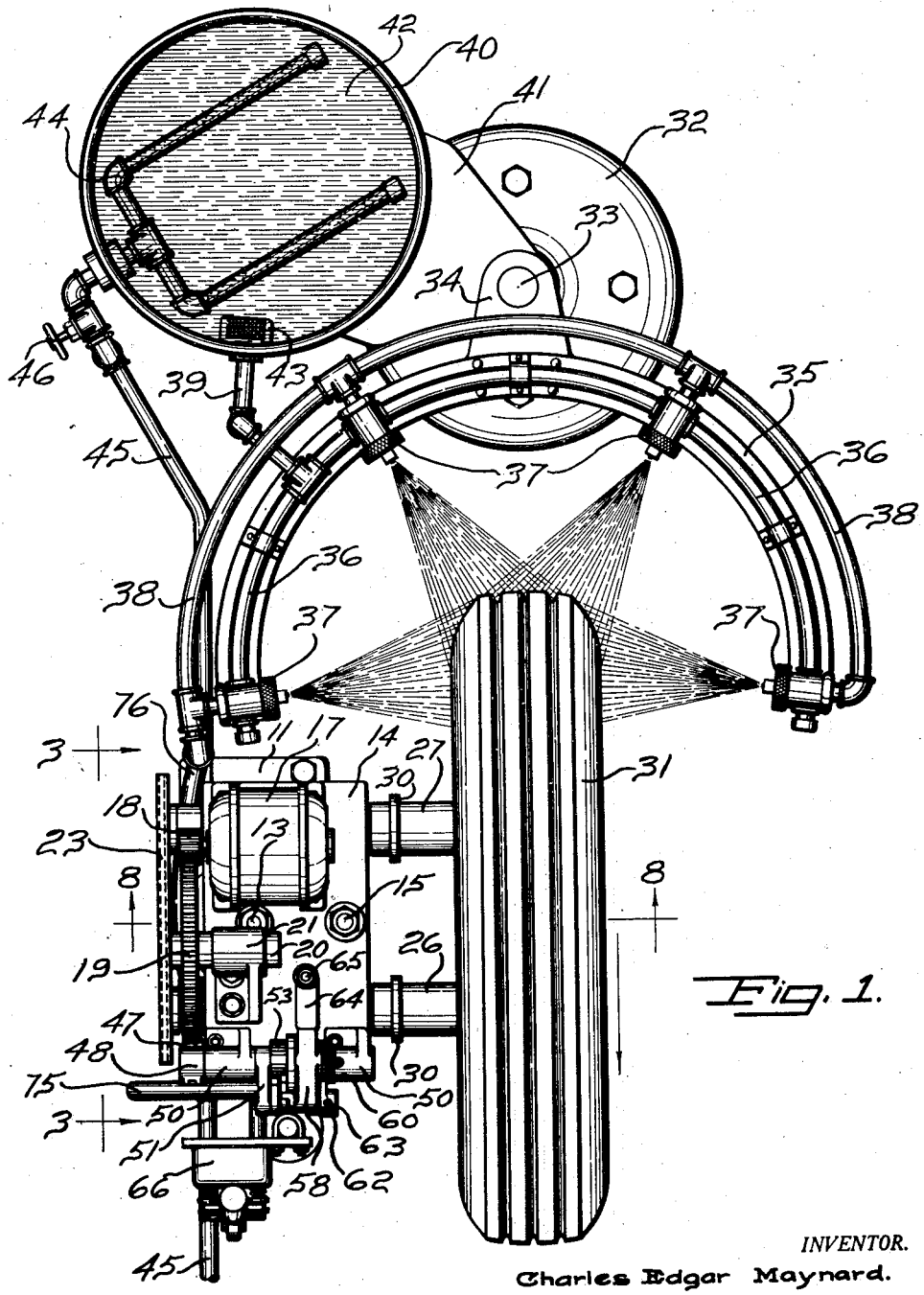

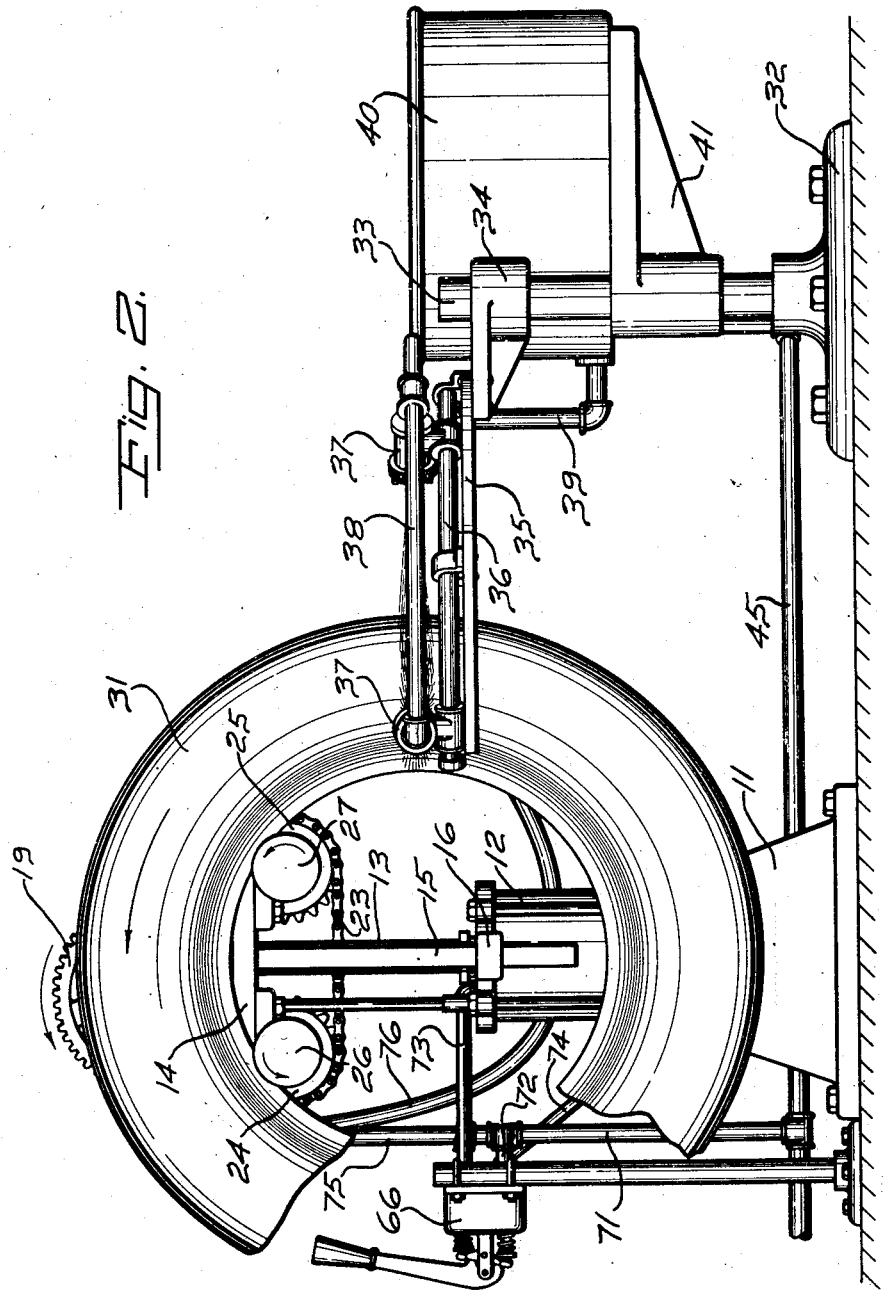

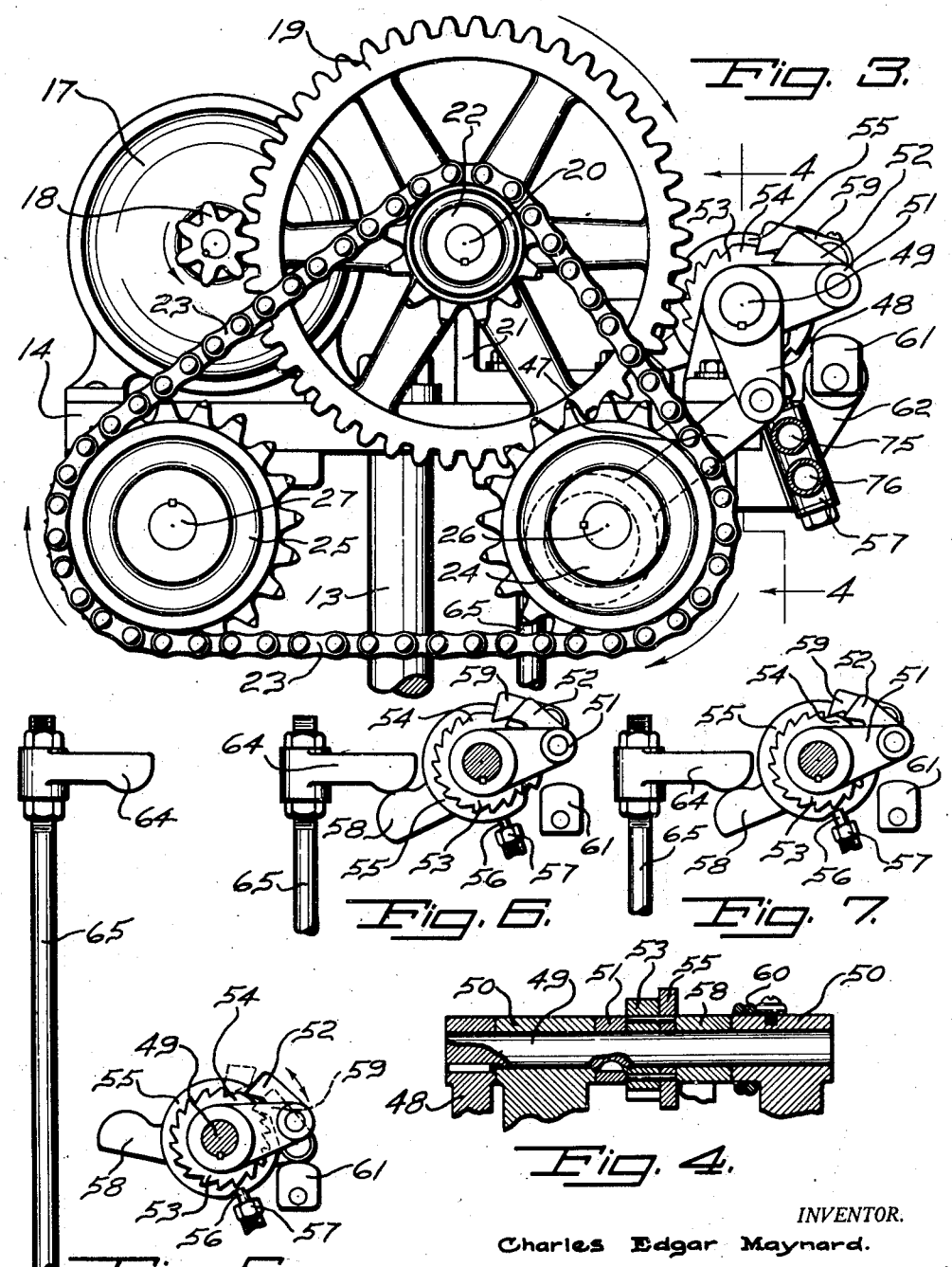

Patented Mar. 22, 1932

1,850,238

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

APPARATUS FOR SPRAYING ANNULAR ARTICLES

Application filed May 31, 1929. Serial No. 367,573.

My invention relates to machines for spraying liquids and more particularly to a machine for spraying liquids on annular articles such as tires for vehicles. The object of my invention is to provide a machine which will be substantially automatic in operation and also to provide a machine which will spray a tire rapidly and evenly. Other objects will be apparent from the specification and claims.

Referring to the drawings which show one embodiment of my invention,

Fig. 1 is a plan view of the machine in operating position;

Fig. 2 is a side view of the machine shown in Fig. 1;

Fig. 3 is a view taken on line 3—3 of Fig. 1, but on a larger scale;

Fig. 4 is a sectional view taken on line 4—4 of Fig. 3;

Figs. 5, 6 and 7 are detail views of certain of the timing unit parts showing their operating movements;

Fig. 8 is a sectional view taken on line 8—8 of Fig. 1;

Fig. 9 is a partial side view showing the inoperative position; and

Fig. 10 is a diagrammatic view showing the piping connections for the various parts.

In the drawings 11 represents a base on which is vertically mounted a two-way cylinder 12, the piston rod 13 of which is secured, as shown in Fig. 8, to a plate 14. A guiding rod 15, which is also secured to the plate 14, is slidably positioned in a lug 16 formed on the cylinder 12 to prevent any rotation of the plate 14. The piston rod 13 extends through both ends of the cylinder so that when the cylinder is operated the plate 14 will be raised or lowered within the limits of the cylinder and will be substantially rigid in any position.

Mounted on the plate 14 is an electric motor 17, see Figs. 1 and 3, which bears a pinion 18 meshing with a gear 19 keyed to a shaft 20 which in turn runs in a bearing 21 bolted to the plate 14. A sprocket 22 is also keyed to the shaft 20 and meshes with a chain 23 to drive sprockets 24 and 25 which are respectively keyed to shafts 26 and 27 running in bearings bolted to the underside of plate 14. As shown in Figs. 1 and 8, the shafts 26 and 27 extend beyond the plate 14 and are formed with collars 30 to position a tire casing 31. The motor 17 acting through gears 18 and 19, sprocket 22, chain 23 and sprockets 24 and 25 serves to continuously rotate the shafts 26 and 27 in the direction of the arrows shown in Figs. 2 and 9, and the tire casing 31 supported by these shafts will be rotated in the direction of the arrows shown in Figs. 1 and 2.

Vertically mounted in a base 32 is a post 33 on which is mounted a bracket 34. Bolted to the latter is an arcuate member 35 supporting a pipe 36 in the shape of a half ring. Connected to the pipe 36 are four air operated spray nozzles 37 which may be of a type commercially available so their detailed construction is not shown in the drawings. Concentrically positioned in respect to the pipe 36 is another pipe 38 used to supply compressed air to the spray nozzles 37. A pipe 39 leads from the pipe 36 to the bottom of a supply tank 40 supported on a bracket 41 journaled to the post 33. The half ring pipes 36 and 38 and the connected spray nozzles 37 are so positioned in respect to the tire casing 31 that the horizontal section of the latter is centered in the half ring pipes so that when compressed air is introduced into the pipe 38 it will draw liquid 42 from the supply tank 40, into pipe 39, pipe 36, and into the spray nozzles 37, and spray the tire as shown in Fig. 1. Sometimes the liquid to be sprayed is of thick consistency so that if certain precautions are not taken the apparatus may become clogged. To overcome this I have placed a strainer 43 over the opening of pipe 39 into the supply tank 40 and provided an agitator 44 comprising two interconnected lengths of pinholed pipe placed at the bottom of the tank 40. A connection 45 in which is a regulating valve 46 supplies compressed air to the agitator thus permitting the operator to keep the liquid 42 in a workable state.

In order to control the length of spraying time and also its synchronism with the movements of the tire I have provided a timing and controlling unit comprising a crank 47 eccentrically mounted to the shaft 26 (Fig. 3) and linked to an arm 48 keyed to a shaft 49 mounted in bearings 50 bolted to the plate 14. Also keyed to the shaft 49 is another arm 51 at the end of which is pivoted a pawl 52. It will be evident from the foregoing that the crank 47 will act to continuously oscillate the pawl 52 as shown by the arrows and dotted position in Fig. 5. Mounted on the shaft 49 so as to be freely rotatable is a ratchet wheel 53 positioned to be acted upon by the pawl 52. This ratchet wheel has a tooth 54 which is double size so that when this tooth is under the pawl 52 the pawl will not index the ratchet wheel, but if the latter is slightly rotated the pawl will engage the next regular size tooth and then index the ratchet wheel through one revolution and stop when the double size tooth is again under the pawl. Pinned to the ratchet wheel 53 is a cam 55 positioned to engage a plunger 56 of a shut-off or whistle valve 57. At one place on its periphery this cam 55 allows the plunger 56 to close the valve 57 and this is when the tooth 54 is under the pawl 52 (Figs. 5 and 7). Freely mounted on the shaft 49 is a lever 58 with a spring pressed pawl 59 (engaging the ratchet wheel 53) pivotally secured to one end. A spring 60 (Fig. 4) acts on the lever 58 to normally hold it against a stop 61 fixed in a support 62 by a set screw 63. As is shown in Figs. 5, 6 and 7, the lever 58 is positioned to engage, when the plate 14 is raised by the cylinder 12, a striker 64 adjustably secured to a post 65 which passes through a hole in the plate 14 and is attached to the cylinder 12. When this occurs the striker 64 will rotate the lever 58 against the spring 60, as shown in Fig. 6, to index the ratchet wheel one tooth in the direction of the arrow. Immediately the continuously oscillating pawl 52 will index the ratchet wheels 53 around to complete one revolution and then the double tooth 54 comes under the pawl 52 again to stop the rotation. This causes the cam 55 to hold the valve 57 open during the time required to make the one revolution. The position of the parts after this revolution is shown in Fig. 7 and when the plate 14 is lowered the lever 58 leaves the striker 64 and the spring 60 will return the lever back to stop 61 so that when the plate 14 is again raised the operations will be repeated. By rotating the setting of stop 61 180° from the position shown in Figs. 5, 6 and 7 the pawl 59 may be made to index the ratchet wheel ahead two teeth each time thus shortening the open period of the valve during each cycle of operation.

The admission of compressed air to the pneumatic cylinder 12 is under the control of a main valve 66, the connections to which are illustrated diagrammatically in detail in Fig. 10. The valve is composed of plungers 67, 68, 69 and 70, which have been shown conventionally only in the drawings as the valve is of a standard commercial type. Plungers 67 and 68, and 69 and 70, are connected so that they operate in pairs, the two pairs being simultaneously actuated in opposite directions. Thus when the valves 67 and 68 are open valves 69 and 70 are closed or vice versa. Leading to an air supply connection 45 is a connection 71 which leads to valve 67 and by a branch connection 72 to valve 70. Connections 73 and 74, respectively, lead from the valves 68 and 69 to the top and bottom of the cylinder 12. It will be noted that the valves 68 and 69 are connected to an exhaust.

Also connected to the air supply line 45 is a connection 75 leading to the valve 57 which has another connection 76 leading to the air supply pipe 38 of the spray nozzles 37.

As shown in Fig. 9, when the machine is inoperative the plate 14 carrying the continuously rotated shafts 24 and 25 is in the down position and the operations of the machine to spray a tire are as follows: A tire 31 is positioned over the shafts 26 and 27 and the valve 66 is operated to depress the plungers 67 and 68, thus admitting compressed air from connection 71 to connection 74 and into the bottom of cylinder 12 and opening the top of the cylinder to the exhaust through the connection 73 and past plunger 68. This causes the cylinder to raise the plate 14 and all the apparatus carried on it. The continuously rotated shafts 26 and 27 engage the beads of the tire casing 31 and raise it from the floor and at the same time rotate it. Just before the plate 14 reaches its uppermost limit which is, of course, the limit of the cylinder 12, the lever 58 of the timing and controlling unit is acted upon by the striker 64 to cause the pawl 59 to index ahead the ratchet wheel one tooth, thus causing the cam 55 to open the valve 57 which admits compressed air into the pipe 38 causing, as was previously described, the spray nozzles 37 to draw the liquid 42 from the tank 40, into connection 39 and pipe 36 and spray the tire 31. This spraying lasts as long as it takes the continuously oscillating pawl 52 to index the ratchet wheel 53 to complete the one revolution when the cam 55 allows the valve 57 to close. It will be understood that the speed of the shafts 26 and 27 is such that the tire 31 will make at least one revolution during this spraying period. Immediately after the spraying stops the operator reverses the valve 66 to close the plungers 67 and 68 and open the plungers 69 and 70, thus admitting compressed air to the top of the cylinder 12 by connections 71, 72 and 73 and exhausting the bottom through connection 74 and past plunger 69. This causes the cylinder to lower the plate 14 and shafts 26 and 27, thus depositing the tire 31 back on the floor as shown in Fig. 9.

Having thus described my invention, I claim:

1. A device for painting tire casings which comprises a movable support adapted to rotate a tire casing, paint spraying means, means to move said support to position the tire casing in operative relation with the spraying means, a timing mechanism, means associated with said support adapted to initiate the operation of said timing mechanism to admit fluid pressure to the paint spraying means, said timing means being operative after a predetermined time to shut off the fluid presure.

2. In a device of the character described a timing unit comprising a ratchet wheel having an inoperative portion, a cam formed on the ratchet wheel, a valve, the plunger of which engages the cam, the said cam adapted to close the valve at one place on its periphery, a continuously oscillating pawl engaging the ratchet wheel to index the latter except when the inoperative portion is under the pawl, the valve closing portion of the cam being so positioned that the valve is closed when the inoperative portion of the ratchet wheel is under the pawl, and means operable to move the ratchet wheel ahead to disengage the pawl from the inoperative portion of the ratchet wheel to initiate the rotation of the ratchet and cam, the cam operating to hold the valve open during this rotation.

CHARLES EDGAR MAYNARD.